Jan. 22, 1963  D. V. JONES  3,075,136
VARIABLE PULSE WIDTH PARALLEL INVERTERS
Filed Aug. 31, 1961  2 Sheets-Sheet 1
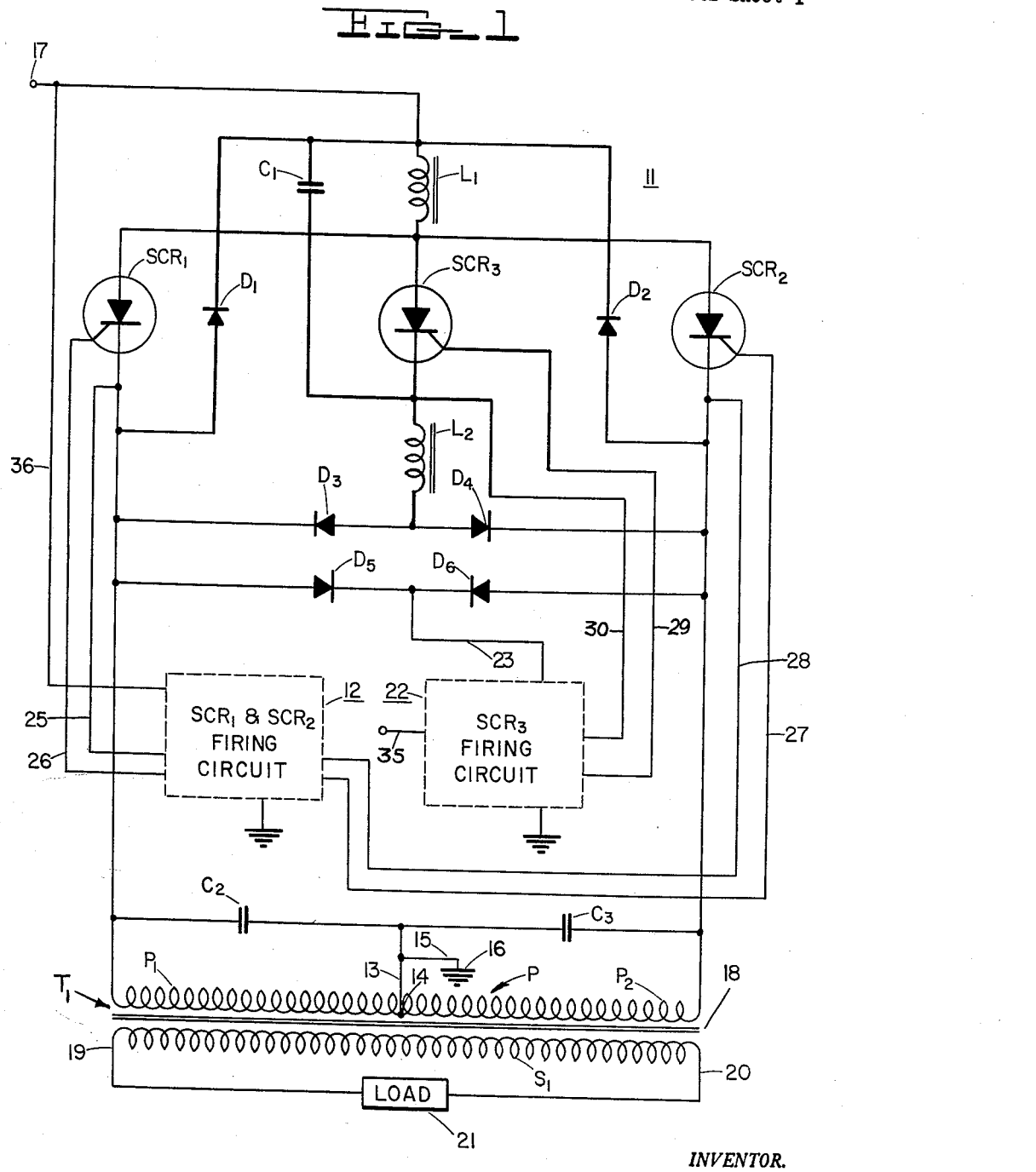
INVENTOR.
Dwight V. Jones,
BY Henry J. Marciniak
Attorney.

Jan. 22, 1963  D. V. JONES  3,075,136
VARIABLE PULSE WIDTH PARALLEL INVERTERS
Filed Aug. 31, 1961  2 Sheets-Sheet 2
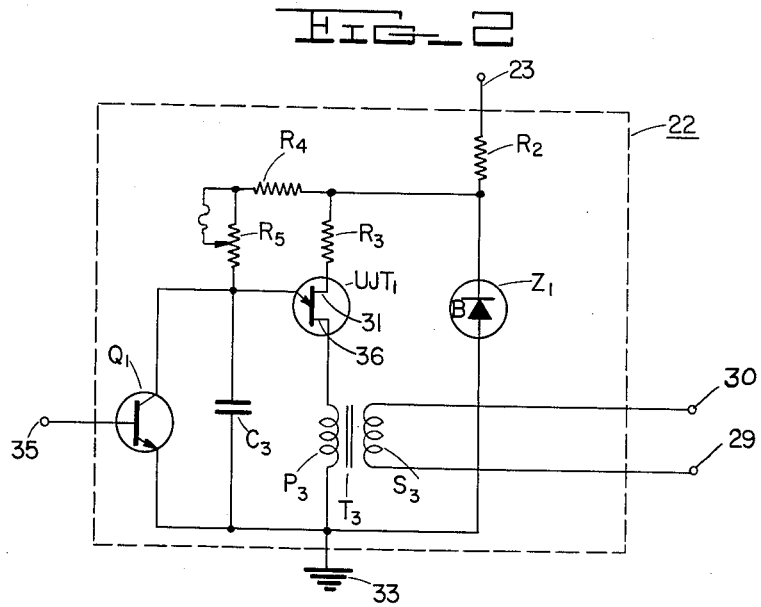
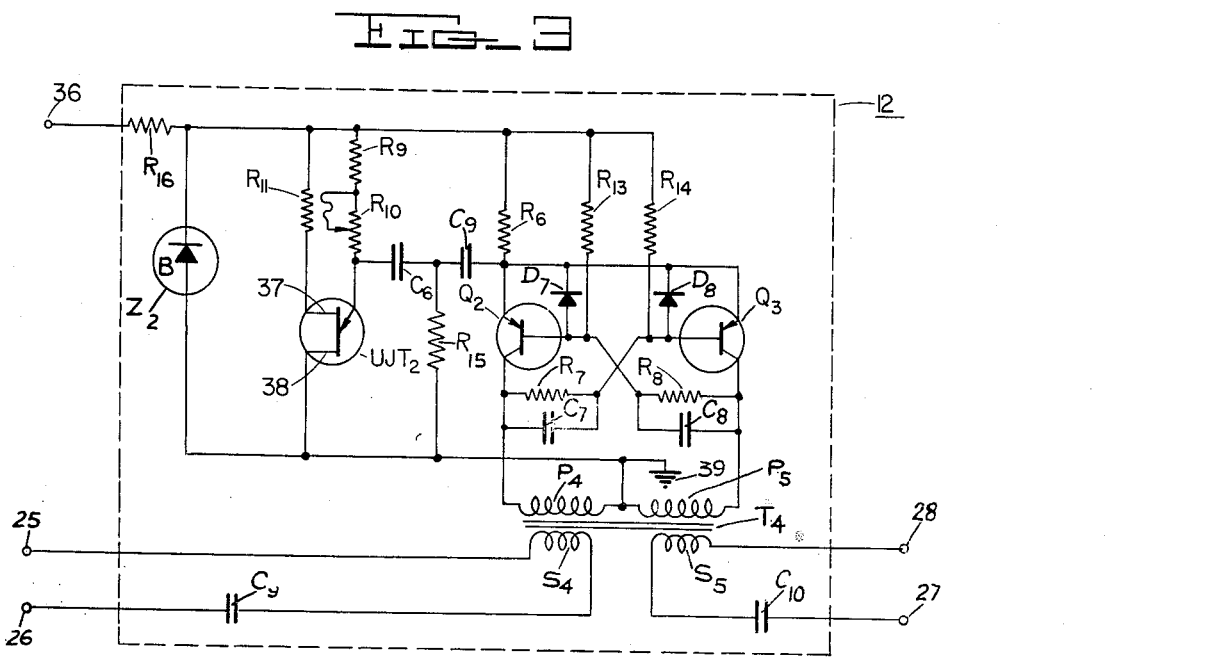
INVENTOR.
Dwight V. Jones,
BY
Henry J. Marciniak
Attorney.

United States Patent Office 3,075,136
Patented Jan. 22, 1963

3,075,136
VARIABLE PULSE WIDTH PARALLEL INVERTERS
Dwight V. Jones, Baldwinsville, N.Y., assignor to General Electric Company, a corporation of New York
Filed Aug. 31, 1961, Ser. No. 135,334
11 Claims. (Cl. 321—45)

This invention relates to parallel inverters and more particularly to an improved arrangement of a parallel inverter wherein the pulse width of the inverter output can be readily controlled.

Parallel inverters employing such switching devises as thyratrons, ignitrons and silicon controlled rectifiers, have been generally used for higher power applications as compared with the series type of inverters. At low operating frequencies, the parallel inverter can be used to provide a substantially square-wave alternating output from a direct current source. By rectifying the output voltage of the parallel inverter, the inverter can be used as a D.C. to D.C. converter or by employing a rectified alternating voltage input, the inverter can be readily adapted for use as a frequency changer.

In many applications of the parallel inverter, it is desirable that the power output of the inverter be effectively regulated. For example, in a lamp dimming system, a wide range of regulation is required to effectively operate the lamps at various levels of luminous intensity. Similarly, in a power supply system for the operation of motors at various speeds, it is desirable, if not necessary, to regulate the power supplied to the motors. Heretofore, the arrangements used to achieve power regulation in a parallel inverter have not been entirely satisfactory. In prior art parallel inverter circuits employing thyratrons, regulation was achieved at the expense of increased commutating capacity, and the circuits were inefficient. There is a need, therefore, for a parallel circuit inverter wherein a high degree of regulation can be achieved readily and efficiently.

Accordingly, an object of this invention is to provide an improved variable pulse width parallel inverter.

Another object of the present invention is to provide an improved parallel inverter wherein regulation of the power supplied by the inverter is efficiently achieved.

It is still another object of the invention to provide an improved parallel circuit inverter wherein the pulse width of the inverter output can be readily varied to achieve regulation by feedback control arrangements.

The foregoing and other objects and advantages of the invention are realized by a parallel inverter circuit having a pair of parallel connected controlled rectifiers which are alternately triggered at a predetermined frequency to cause a reversal of current flow through a first and a second primary winding portion of an output transformer. The conduction time of the pair of controlled rectifiers is controlled by firing a cut-off controlled rectifier at a predetermined point at each half cycle to connect a charged capacitor in parallel with an inductor in the circuit and thus provide a pulse that turns off the conducting one of the pair of controlled rectifiers. In this manner the pulse width of the inverter output is regulated. The firing of the cut-off controlled rectifier is synchronized with the start of the conduction of the controlled rectifiers so that the controlled rectifier is fired after a predetermined interval in each half cycle after one of the pair of controlled rectifiers is fired.

The subject matter which I regard as my invention is set forth in the appended claims. The invention itself, however, together with further objects and advantages thereof may be understood by referring to the following description taken in connection with the accompanying drawings in which:

FIG. 1 is a schematic circuit diagram of a parallel inverter circuit illustrating one embodiment of the invention.

FIG. 2 is a schematic circuit diagram of the firing circuit for triggering controlled rectifier $SCR_3$ of the parallel inverter illustrated in FIG. 1; and FIG. 3 is a schematic circuit diagram of the firing circuit used to alternately trigger controlled rectifiers $SCR_1$ and $SCR_2$ of the parallel inverter illustrated in FIG. 1.

Having more specific reference now to the parallel inverter identified generally by reference numeral 11 and shown in FIG. 1, it will be seen that the parallel inverter 11 includes a pair of controlled rectifiers $SCR_1$ and $SCR_2$ connected in circuit with a first winding portion $P_1$ and a second winding portion $P_2$ of output transformer $T_1$. As the controlled rectifiers $SCR_1$ and $SCR_2$ are alternately triggered by firing circuit 12, a voltage of one polarity is induced across secondary windings $S_1$ during one half of each cycle of the inverter output and a voltage of opposite polarity is induced across the secondary winding $S_1$ in the other half of each cycle.

It will be noted that controlled rectifier $SCR_1$ and primary winding portion $P_1$ are connected in a parallel circuit with controlled rectifier $SCR_2$ and primary winding portion $P_2$ across a direct current supply means which includes a lead 13 connected to a center-tap 14 on primary winding $P_1$, lead 15 connected to a ground 16, and input terminal lead 17 provided for connection to the positive side of a direct current source.

The output transformer $T_1$ has a magnetic core 18 and a secondary winding $S_1$ inductively coupled with the primary winding P which is divided by tap 14 into primary winding portions $P_1$ and $P_2$. As shown in FIG. 1, the secondary winding $S_1$ is connected in circuit by output leads 19, 20 with a load 21. Since transformer $T_1$ is subjected to rapidly changing currents during the commutation interval of the parallel inverter 11, the leakage reactance of the transformer $T_1$ was preferably kept down to a minimum. Thus, the transformer $T_1$ was designed so that it operates below saturation. The leakage inductance between the primary winding portions $P_1$ and $P_2$, and the source impedance is preferably kept relatively small so that it will have no significant effect on the commutation of the controlled rectifiers $SCR_1$ and $SCR_2$.

It will be seen that in the illustrative embodiment of the invention shown in FIG. 1, the input terminal lead 17 is connected in circuit with a pair of feedback diodes $D_1$, $D_2$ and with controlled rectifiers $SCR_1$, $SCR_2$ through an inductor $L_1$. Input terminal lead 17 is provided for connection to a suitable direct current voltage source, which should be capable of accepting power as well as supplying power. Inductor $L_1$ is connected in series circuit with a cut-off controlled rectifier $SCR_3$. A commutating capacitor $C_1$ is connected in parallel circuit across inductor $L_1$ and controlled rectifier $SCR_3$ so that when the controlled rectifier $SCR_3$ is triggered into a conducting state, inductor $L_1$ is connected in electrical circuit and in parallel with the commutating capacitor $C_1$. Thus, when connected in parallel, inductor $L_1$ and the commutating capacitor $C_1$ comprise an oscillatory circuit.

Feedback diode $D_1$ is connected in circuit with one end of primary winding portion $P_1$ and in inverse relation with controlled rectifier $SCR_1$. Similarly, feedback diode $D_2$ is connected in circuit with primary winding portion $P_2$ of the primary winding P and in inverse relation with controlled rectifier $SCR_2$.

Connected in such an arrangement, the feedback diodes $D_1$, $D_2$ serve to limit the voltage across primary winding portions $P_1$, $P_2$ of transformer $T_1$ to the magnitude of the D.C. voltage supply and make it possible to use silicon controlled rectifiers having a lower breakover voltage. Also, as will be hereinafter more full explained in connection with the description of the operation of the parallel inverter 11, the diodes $D_1$, $D_2$ feed back reactive power into the supply and thereby reduce voltage variations across the secondary winding $S_1$.

Continuing with the description of the circuit shown schematically in FIG. 1, it will be seen that one end of the inductor $L_2$ is connected in circuit with commutating capacitor $C_1$ and controlled rectifier $SCR_3$. The other end of the inductor $L_2$ is connected in circuit with the anodes of diodes $D_3$, $D_4$. They are so poled that when either controlled rectifier $SCR_1$ or $SCR_2$ is in a conducting state, the lower plate of capacitor $C_1$, as seen in the view of FIG. 1, will be negatively charged to a voltage considerably greater than the source of voltage. This increased voltage is due to the transformer action in charging the commutating capacitor $C_1$ through the diodes $D_3$ and $D_4$ and also the circuit time constants. Preferably, the inductor $L_2$ provides an inductance sufficient to keep the current flow through it to a low value until the controlled rectifier $SCR_3$ is turned off by the reversal of the current in the oscillatory circuit comprised of the capacitor $C_1$ and the inductor $L_1$.

The controlled rectifiers $SCR_1$, $SCR_2$ and $SCR_3$ used in the illustrative embodiment of the invention were PNPN semiconductors each having three terminals, an anode represented by the arrow symbol, a cathode represented by a line drawn through the apex of the arrow symbol and a gate represented by a diagonal line extending from the cathode. Silicon controlled rectifiers are desirable power switching devices since relatively large amounts of power can be switched into a load using an insignificant amount of power to trigger the switching device. The operating characteristics of a silicon controlled rectifier are such that it conducts in a forward direction with a forward characteristic very similar to that of an ordinary rectifier when a gate signal is applied. Thus, when a positive voltage is applied to the outside P layer and a negative voltage is applied to the outside N layer, the two outside junctions are biased in a forward direction while the inner junction is reversely biased. Current does not flow through the controlled rectifier under these conditions, except for a small leakage current. When the voltage is increased to a breakover voltage, the current gain of the device increases to unity at which time the current through the controlled rectifier will increase suddenly and become a function of the applied voltage and the load impedance. The controlled rectifier will remain in a conductive state provided the current through the device exceeds a minimum holding value.

A small amount of current supplied to the gate lead can be used for controlling the firing of the controlled rectifier since the current supplied to the gate lowers the breakover voltage. The controlled rectifier is normally operated well below the forward breakover voltage and is triggered by supplying current to the gate lead.

A capacitor $C_2$ is connected in circuit with the cathode of controlled rectifier $SCR_1$ and across the primary winding portion $P_1$ so that the cathode is clamped to ground when a negative turn-off pulse is applied to the anode of controlled rectifiers $SCR_1$. It also serves to minimize switching transients from the load. Similarly, capacitor $C_3$ is connected in circuit with controlled rectifier $SCR_2$ and across primary winding portion $P_2$ of the output transformer $T_1$ so that the cathode of controlled rectifier $SCR_2$ is clamped to ground when a negative turn-off pulse is applied to its anode. Capacitors $C_2$ and $C_3$ enhance the performance of the circuit, but they are not absolutely necessary since the circuit will operate without them.

In order to provide a unidirectional supply voltage for firing circuit 22, diodes $D_5$ and $D_6$ are connected across the primary winding P. A lead 23 is connected in circuit with cathodes of the diodes $D_5$, $D_6$, the anodes being connected in circuit with the cathodes of controlled rectifiers $SCR_1$, $SCR_2$. Thus, firing circuit 22 is energized when either controlled rectifier $SCR_1$ or $SCR_2$ is conducting. It will be seen that the diode $D_5$ is poled so that when controlled rectifier $SCR_1$ starts conducting, a current is supplied to firing circuit 22. Also, diode $D_6$ is poled so that current will be supplied to firing circuit 22 the instant controlled rectifier $SCR_2$ is triggered. In this manner the firing circuit 22 is synchronized with the start of each half cycle of the inverter output which begins with the triggering of one of the controlled rectifiers $SCR_1$, $SCR_2$.

In FIGS. 2 and 3, I have illustrated the schematic circuit diagrams which are represented in the schematic diagram of FIG. 1 in block form. Firing circuit 12 is connected in circuit with the gates and cathodes of controlled rectifiers $SCR_1$, $SCR_2$ by electrical leads 25, 26 and 27, 28, respectively. The gate and cathode of cut-off controlled rectifiers $SCR_3$ are connected in circuit with firing circuit 22 by means of electrical leads 29, 30. The type of firing circuits 12 and 22 which were employed in the exemplification of the invention shown in FIG. 1 are well known in the art and are described in the General Electric Controlled Rectifier Manual, first edition, 1960, at pages 50–58.

In accordance with the invention, the firing circuit 22 provides a current pulse to fire controlled rectifier $SCR_3$ which turns off the conducting controlled rectifier $SCR_1$ or $SCR_2$ at a predetermined point in each half cycle. It will be seen that input lead 23 connects firing circuit 22 in circuit with the controlled rectifiers so that a current is supplied only when one of the controlled rectifiers is conducting. A resistor $R_2$ and the zener diode $Z_1$ limit the maximum interbase voltage of unijunction transistor $UJT_1$. The zener diode $Z_1$ is a semiconductor diode, preferably a silicon diode, having a predetermined reverse breakdown voltage. For voltages below the breakdown value, the zener diode $Z_1$ acts as a rectifier and only a negligibly small current can flow in the reverse direction. When the reverse voltage exceeds the breakdown value, the zener diode $Z_1$ presents a very low resistance and permits current to flow freely in the reverse direction with no substantial increase in voltage.

A resistor $R_3$ is connected in circuit with the base-two electrode 31 in order to compensate for temperature variations of the interbase resistance of the unijunction transistor $UJT_1$. Capacitor $C_3$ is charged through resistor $R_4$ and the variable resistor $R_5$. The rate at which the capacitor $C_3$ is charged to the peak emitter voltage of unijunction transistor $UJT_1$ determines the point in each half cycle at which unijunction transistor $UJT_1$ is fired. When unijunction transistor $UJT_1$ is fired, a pulse of current flows through primary winding $P_3$ of the pulse transformer $T_3$ and a current pulse is induced in the secondary winding $S_3$, electrical leads 29, 30 applying this pulse across the gate and cathode of cut-off controlled rectifier $SCR_3$. It will be seen that the primary winding $P_3$ is connected at one end with base-one electrode 32 and at the other end with a ground 33.

Transistor $Q_1$ acts as a shunt to divert charging current flowing through the resistor $R_4$ and $R_5$. The amount of charging current diverted is proportional to the amount of current supplied to the base electrode of the transistor through lead 35. Thus, as base current is increased, additional current is diverted and the firing angle of the unijunction transistors $UJT_1$ is retarded. Accordingly, the firing of controlled rectifier $SCR_3$ is also retarded and the cut-off of the conducting controlled rectifier $SCR_1$ or $SCR_2$ is delayed.

In FIG. 3, I have illustrated a transistor multi-vibrator firig circuit 12 that was used in the illustrative embodiment of the invention to alternately apply firing pulses to controlled rectifiers $SCR_1$ and $SCR_2$. Two pairs of output leads 25, 26 and 27, 28 which are connected in circuit with the secondary windings $S_4$, $S_5$ of pulse transformers $T_4$ are provided for connection across the gate and cathode of controlled rectifiers $SCR_1$, $SCR_2$, respectively, as shown in FIG. 1. The primary winding portions $P_4$, $P_5$ are connected in circuit with the collector of transistors $Q_2$, $Q_3$. Input terminal lead 36 is provided for connection to the positive side of the direct current source used to energize the parallel inverter in FIG. 1.

Although in the exemplification of the invention a multi-vibrator circuit configuration was used to provide alternating trigger pulses with good symmetry to the controlled rectifiers $SCR_1$, $SCR_2$, it will be appreciated that other firing circuits can be used to generate and provide alternate triggering pulses at a predetermined frequency to a pair of controlled rectifiers. As an example, a pair of unijunction transistor relaxation oscillators coupled together by means of a capacitor connected between the emitters may be employed to provide the alternating pulses. Also, firing circuits utilizing saturating reactors may be used as a pulse source.

The unijunction relaxation oscillator portion of the multi-vibrator circuit provides good symmetry and frequency control to the multi-vibrator. Although in exemplification of the invention the inverter circuit 11 shown in FIG. 1 was supplied with short duration trigger pulses to fire controlled rectifiers $SCR_1$ and $SCR_2$, for highly reactive loads the trigger pulse width must be extended in time for the duration of reactive current flow. The maximum pulse width at the gate connot exceed the inverter pulse width, therefore for large reactive loads the trigger pulse width must follow the changing inverter pulse width. This varying trigger pulse width can be obtained by varying the symmetry of a multivibrator as a function of the inverter pulse width.

Continuing now with the description of the firing circuit 12 shown schematically in FIG. 3, it will be seen that the firing circuit 12 employs two PNP transistors $Q_2$, $Q_3$ in a saturating flip-flop arrangement. A unijunction transistor $UJT_2$ serves to trigger the flip-flop from one state to the other by providing a negative trigger pulse. This negative pulse is developed across resistor $R_{15}$ and is coupled to the resistor $R_6$ by means for the capacitor $C_9$. Capacitor $C_6$ serves as a timing capacitor. Cross coupling capacitors $C_7$ and $C_8$ are relatively small in size and are connected in parallel with the cross-coupling resistors $R_7$, $R_8$ and in circuit with the base electrodes of transistors $Q_2$, $Q_3$. Diodes $D_7$ and $D_8$ clamp the base electrode of transistors $Q_2$, $Q_3$ to the emitter electrode.

Resistor $R_9$ and the variable resistor or potentiometer $R_{10}$ control the charging rate of the timing capacitor $C_6$ and thereby serve as the frequency control for the inverter circuit. Resistor $R_{11}$ is connected to the base-two electrode 37 of the unijunction transistor $UJT_2$. Base-one electrode 38 is connected in circuit with a ground 39 by means of leads 40, 41. Resistors $R_6$, $R_{13}$, $R_{14}$ serve as temperature stabilizing resistors. Resistor $R_{10}$ provides the frequency control for the output of the inverter since it controls the rate at which the flip-flop is triggered. Capacitors $C_9$ and $C_{10}$ in conjunction with the gate to cathode impedance of the controlled rectifier differentiate the square wave across secondary windings $S_4$ and $S_5$ to provide a pulse output. Pulse triggering can be used unless the load has a low and lagging power factor. Through the action of the zener diode $Z_2$ and resistor $R_{16}$ a regulated D.C. voltage is applied to the unijunction transistor $UJT_2$.

Having reference now to the circuit shown in FIGS. 1, 2 and 3, the operation of the parallel inverter circuit 11 will now be more fully described. When the positive terminal of a direct current source is connected in circuit with input terminal lead 17 and the inverter circuit 11 is effectively grounded as shown in FIG. 1, inverter circuit 11 is energized. Let us assume arbitrarily that a firing pulse is supplied initially to the gate of the controlled rectifier $SCR_1$. When controlled rectifier $SCR_1$ is triggered, the commutating capacitor $C_1$ is charged to a voltage that is greater in magnitude than the impressed voltage due to the transformed action that charges the capacitor $C_1$ through the diode $D_4$. Also, when controlled rectifier $SCR_1$ is triggered, current flows through diode $D_5$ to firing circuit 22 and capacitor $C_3$ begins its charging period.

Depending upon the setting of the variable resistor or potentiometer $R_5$ and the feed-back current being supplied to the transistor $Q_1$, the unijunction transistor $UJT_1$ will trigger the control rectifier $SCR_3$ at a predetermined point in the half cycle of the alternating inverter output. When controlled rectifier $SCR_3$ is triggered, it will be seen that the lower plate of the commutating capacitor $C_1$ is negatively charged. Also, when controlled rectifier $SCR_3$ is triggered, commutating capacitor $C_1$ is connected in parallel circuit relation with the inductor $L_1$. An oscillatory pulse is developed across the inductor $L_1$ which reverse biases controlled rectifier $SCR_1$ and thereby turns it off.

The commutating capacitor $C_1$ will maintain a reverse bias across controlled rectifier $SCR_1$ long enough for the controlled rectifier $SCR_1$ to return to a blocking state. Capacitor $C_2$ clamps the cathode of controlled rectifier $SCR_1$ to ground 16 while the negative turn-off pulse is applied to the anode. It will be seen that controlled rectifier $SCR_3$ conducts for a very short interval since it is reverse biased when the current reverses in the oscillatory circuit comprised of capacitor $C_1$ and the inductor $L_1$.

During the commutating interval an inductive load connected at the output of the inverter circuit 11 would prevent the main load current from reversing instantaneously. Diodes $D_1$, $D_2$ are therefore provided to feedback this current to the direct current supply until the load current reverses. In the first half of each cycle it will be appreciated that during the interval that current flows through diode $D_2$, controlled rectifier $SCR_2$ will be back-biased, and if conducting, would be turned off. For highly reactive loads, the triggering pulse width provided by firing circuit was extended in time for the duration of the reactive current flow but did not exceed the inverter pulse width.

Continuing with the description of the operation of the inverter circuit, the second half of the cycle commences when a pulse is supplied to the gate of controlled rectifier $SCR_2$. With controlled rectifier $SCR_2$ conducting, the commutating capacitor $C_1$ is charged through diode $D_3$, the lower plate of capacitor $C_1$ as seen in FIG. 1, again being negatively charged. The turn-off of controlled rectifier $SCR_2$ is accomplished in the same manner as the turn-off of controlled rectifier $SCR_1$. Firing circuit 22 triggers controlled rectifier $SCR_3$ which connects the negatively charged plate of the commutating capacitor $C_1$ in circuit with the anode of controlled rectifier $SCR_2$ and also connects the capacitor $C_1$ in parallel circuit with inductor $L_1$. Thus, a negative pulse is developed across the inductor $L_1$ which results in a reverse bias being applied across controlled rectifier $SCR_2$ and it is turned off. Similarly, diode $D_1$ feeds back to the direct current source reactive power during the commutating interval, the amount of the feed-back being proportional to the inductive components of the load.

It will be seen that as the firing circuit 12 applies positive trigger pulses alternately to the gates of the controlled rectifiers $SCR_1$, $SCR_2$, the current from the direct current supply will flow alternately through the opposite ends of the primary winding P of the transformer $T_1$ and generate an alternating current voltage across secondary winding $S_1$. According to the invention, regulation of the output across the secondary winding $S_1$ is achieved by turning off the conducting controlled rectifier in each half cycle to vary the pulse width of the inverter output.

From the foregoing description of the inverter circuit and its operation, it will be seen that the conduction time is regulated by firing controlled rectifier $SCR_3$ at a predetermined point in each half cycle to connect the commutating capacitor $C_1$ in parallel with the inductor $L_1$ so that an oscillatory pulse is provided to turn off the conducting controlled rectifier. The pulse width of the output voltage can be readily varied in response to demands of the load thereto. The components used in the turn-off circuit arrangement in accordance with the invention have low power requirements since they handle only the turn-off energy for the controlled rectifier $SCR_1$, $SCR_2$. Further, the arrangement in accordance with the invention is readily adaptable to a feed-back type of control.

It will be understood that the preferred embodiment of the invention described herein is intended as an illustrative example of the invention and that the invention is not necessarily limited to such an embodiment thereof. It will be apparent that many modifications of the invention described herein may be made. As, for example, the inverter circuit may be modified so that the positive terminal and negative terminal connection of the power supply are reversed. Further, the inverter circuit arrangement of the invention is adaptable to three phase applications. It is to be understood, therefore, that I intend by the appended claims to cover all such modifications that fall within the true spirit and scope of the invention.

What I claim as new and desire to secure by Letters Patent of the United States is:

1. In a parallel inverter having a first controlled rectifier and a first primary winding portion connected in parallel circuit relation with a second controlled rectifier and a second primary winding portion across a direct current supply means, an inductor connected in circuit with said first and second controlled rectifier, a commutating capacitor, a cut-off controlled rectifier, circuit means connecting said cut-off controlled rectifier in series circuit relation with said inductor and in parallel circuit relationship with said commutating capacitor, a first firing circuit means to alternately fire said first and second controlled rectifier, a second firing circuit means connected in circuit with said cut-off controlled rectifier to fire said cut-off controlled rectifier at a predetermined point in each half cycle after said first and second controlled rectifiers are fired, said cut-off controlled rectifier when triggered causing an oscillatory pulse to be induced across said first inductor thereby turning off the conducting one of said first and second controlled rectifiers.

2. The inverter circuit as set forth in claim 1 wherein said second firing circuit means includes a first and a second diode, each of said diodes having an anode and a cathode, the anode of said first diode being connected in circuit with the cathode of said first controlled rectifier and the anode of said second diode being connected in circuit with the cathode of said second controlled rectifier, the cathodes being connected in circuit with a unijunction transistor oscillator and causing said oscillator to be energized only when one of said first and second controlled rectifiers are in a conducting state thereby synchronizing said second firing circuit means with said first and second controlled rectifiers.

3. The inverter circuit as set forth in claim 1 wherein a capacitor is connected across each of said first and second primary winding portions in order to clamp the cathodes of said first and second controlled rectifiers to ground when a negative oscillatory pulse is applied to the anodes thereof.

4. In a parallel inverter having a pair of controlled rectifiers and a transformer with a secondary and a first and a second primary winding portion, one of said controlled rectifiers and said first winding portion being connected in parallel circuit relation with the other of said controlled rectifiers and said second winding portion and in circuit with a direct current supply means, a cut-off controlled rectifier having an anode, a cathode and a gate electrode, a first inductor connected in circuit with said pair of controlled rectifiers, a commutating capacitor connected in series circuit relation with the cathode of said cut-off controlled rectifier and in circuit with said first inductor so that when said cut-off controlled rectifier is triggered said commutating capacitor is connected in parallel circuit relation with said first inductor, said first inductor and said capacitor comprising an oscillatory circuit, a second inductor connected in circuit with said commutating capacitor, a pair of diodes, circuit means connecting said diodes in circuit with said pair of controlled rectifiers and said commutating capacitor so that said capacitor is charged during each half cycle when one of said first and second controlled rectifiers is conducting, firing circuit means connected with the gate of said cut-off controlled rectifier, said firing circuit means triggering said cut-off controlled rectifier at a predetermined point in each half cycle, circuit means alternately triggering one of said pair of controlled rectifiers into a conducting state to provide an alternating output across the secondary of said transformer, said cut-off controlled rectifier when in a conducting state connecting said commutating capacitor in parallel circuit with said first inductor thereby producing an oscillatory pulse across said inductor to turn off the conducting one of said pair of controlled rectifiers.

5. A parallel inverter comprising a transformer having a secondary winding and a primary winding split into a first primary winding portion and a second primary winding portion, a first controlled rectifier connected in series circuit relation with said first winding portion, a second controlled rectifier connected in series circuit relation with said second winding portion, a direct current supply means, said serially connected first controlled rectifier and first winding portion being connected in parallel circuit relation with said serially connected second controlled rectifier and second winding portion, firing circuit means connected in circuit with said first and second controlled rectifiers to cause a current to flow in one direction through said first winding portion in one half cycle and in an opposite direction through a second winding portion in the other half cycle, a turn-off controlled rectifier having an anode, a cathode and a gate, an inductive means connected in circuit with said first and second controlled rectifiers and in circuit with the anode of said cut-off controlled rectifier, a capacitor connected in circuit with the cathode of said cut-off controlled rectifier, said capacitor and said inductive means comprising an oscillatory circuit, circuit means connecting said capacitor in circuit with said first and second controlled rectifier so that said commutating capacitor is charged in each half cycle when one of said first and second controlled rectifiers is conducting, firing circuit means connected to the gate of said cut-off controlled rectifier and firing said cut-off controlled rectifier at a predetermined point in each half cycle after one of said first and second controlled rectifiers is fired to control the pulse width of the output across the secondary winding of said transformer.

6. In a parallel inverter circuit having a transformer with a first primary winding portion and a secondary primary winding portion inductively coupled with a secondary winding, a pair of controlled rectifiers, each of said controlled rectifiers having an anode, a cathode and a gate, one of said controlled rectifiers and said first primary winding portion being connected in parallel with the other of said controlled rectifiers and said second primary winding portion and in circuit with a direct current supply means, a cut-off controlled rectifier having an anode, a cathode and a gate, an oscillatory circuit means connected in circuit with the anodes of said pair of controlled rectifiers and in circuit with said cut-off controlled rectifier, said cut-off controlled rectifier when triggered causing a negative oscillatory pulse to be produced in said oscillatory circuit thereby turning off the conducting one of said pair of controlled rectifiers, and circuit means connected in circuit with the gate of said cut-off controlled rectifier to fire said cut-off controlled rectifier at a predetermined point in each half cycle to control the conduction period of said pair of controlled rectifiers and thereby regulate the pulse width of the output of said parallel inverter.

7. A parallel inverter having a transformer with a split primary divided into a first primary winding portion and a second primary winding portion inductively coupled with a secondary winding, a direct current supply means, and a pair of controlled rectifiers, each of said controlled rectifiers having an anode, a cathode and a gate, said pair of controlled rectifiers being alternately fired at a predetermined frequency to provide an alternating output across said secondary winding, one of said controlled rectifiers and said first winding portion being connected in parallel circuit relation with the other of said controlled rectifiers and said second primary winding portion across said direct current supply means, a cut-off controlled rectifier having an anode, a cathode and a gate electrode, an inductor connected in circuit with the anodes of said pair of controlled rectifiers and in circuit with the anode of said cut-off controlled rectifier, a capacitor connected in circuit across said inductor and said cut-off controlled rectifier, a pair of diodes, said diodes being connected in circuit with said capacitor and the cathodes of said pair of controlled rectifiers so that when one of said pair of controlled rectifiers is fired said capacitor is charged, firing circuit means firing said cut-off controlled rectifier at a predetermined point in each half cycle to cut-off the conducting one of said pair of controlled rectifiers thereby regulating the pulse width of the inverter output.

8. In an inverter circuit having a transformer with a primary winding split into a first primary winding portion and a second primary winding portion, a direct current supply means, a pair of controlled rectifiers, one of said controlled rectifiers and said first primary winding portion being connected in parallel circuit relation with the other of said controlled rectifiers and said second primary winding portion in circuit with the direct current supply means, a cut-off controlled rectifier having an anode, a cathode and a gate, and a first inductor connected in series circuit with the anodes of said pair of controlled rectifiers and the anode of said cut-off controlled rectifier, a capacitor connected in circuit across said first inductor and said cut-off controlled rectifier, said first inductor and said capacitor comprising an oscillatory circuit, a second inductor connected at one end with the cathode of said cut-off controlled rectifier and in circuit with said capacitor, a pair of diodes, each having an anode and cathode, the anodes of said diodes being connected in circuit with said second inductor and the cathodes being connected in circuit across said primary winding of said transformer and firing circuit means to trigger said cut-off controlled rectifier at a predetermined point in each half cycle during the conduction period of said pair of controlled rectifiers to turn off the conducting one of said pair of controlled rectifiers and thereby regulate the pulse width of said inverter output.

9. A parallel inverter comprising a transformer having a primary winding with a central tap dividing the primary winding into a first winding portion and a second winding portion, and a secondary winding inductively coupled with the primary winding on a magnetic core, said tap being provided for connection to ground, a pair of controlled rectifiers, each of said controlled rectifiers having an anode, a cathode and a gate, the cathode of one of said controlled rectifiers being connected in circuit with one end of said first winding portion and the cathode of the other of said controlled rectifiers being connected in circuit with the other end of said primary winding, a direct current supply means, an inductor having one end connected in circuit with the anodes of said controlled rectifiers, and the other end thereof connected in circuit with said direct current supply means, a first diode connected in inverse relation across said first controlled rectifier and said inductor, a second diode connected in inverse relationship across said second controlled rectifier and said inductor, a cut-off controlled rectifier having an anode, a cathode and a gate, a second inductor, said cut-off controlled rectifier having its anode connected in circuit with said first inductor and its cathode in circuit with one end of said second inductor, a pair of diodes connected in circuit with the other end of said second inductor, each of said diodes having an anode and cathode, the cathode of one of said aforementioned diodes being connected in circuit with the cathode of said first controlled rectifier and the cathode of the other of said aforementioned diodes being connected in circuit with the cathode of said second controlled rectifier, a capacitor connected in circuit across said first inductor and said cut-off controlled rectifier, said capacitor and first inductor comprising an oscillatory circuit, firing circuit means connected in circuit with the gates of said first and second controlled rectifiers to alternately fire said controlled rectifiers to provide an output voltage of alternating polarity across the secondary winding of said transformer and a second firing circuit means connected in circuit with the gate and cathode of said cut-off controlled rectifier to fire said cut-off controlled rectifier at a predetermined point in each half cycle to cause said first inductor and said capacitor to be connected in parallel thereby resulting in an oscillatory pulse across said first inductor, said oscillatory pulse causing the conducting one of said first and second controlled rectifiers in each half cycle to be turned off thereby regulating the pulse width at the inverter output.

10. In a parallel inverter apparatus having a pair of controlled rectifiers connected in parallel across the primary winding of a transformer to cause a direct current to be alternately discharged through a first and a second primary winding portion, an inductor connected in circuit with the controlled rectifiers, a turn-off controlled rectifier having an anode, a cathode and a gate electrode, a firing circuit means triggering said turn-off controlled rectifier at a predetermined point in each half cycle, a commutating capacitor, circuit means connecting said inductor, said turn-off controlled rectifier and commutating capacitor so that when said turn-off controlled rectifier is in a conducting state said inductor is connected in parallel circuit relation with said commutating capacitor, said inductor and said commutating capacitor comprising an oscillatory circuit, said conducting controlled rectifier in each half cycle being turned off by the resonant pulse produced across said inductor and said turn-off controlled rectifier being turned off when the current reverses in said oscillatory circuit.

11. A parallel inverter circuit comprising a transformer having a primary winding and a secondary winding, a tap on said primary winding dividing said primary winding into a first and a second winding portion, said secondary winding having a pair of output terminal leads, a pair of controlled rectifiers, each of said controlled rectifiers having an anode, a cathode and a gate, firing circuit means connected in circuit with said gate and cathode of said controlled rectifiers to alternately trigger said controlled rectifiers at a predetermined frequency, one of said controlled rectifiers being triggered at the start of the first half of each cycle and the other of said controlled rectifiers being triggered at the start of the second half of each cycle, a direct current supply means, circuit means connecting said controlled rectifiers, said direct current supply, said tap in circuit with said first and second winding portions so that when one of said controlled rectifiers is triggered a current is caused to flow in the first winding portion in one direction and when the other of said controlled rectifiers is triggered a current is caused to flow in an opposite direction in the second winding portion thereby producing an alternating current in the secondary winding of said transformer, an inductor connected in circuit with said controlled rectifiers, a capacitor, a turn-off controlled rectifier, a firing circuit means triggering said turn-off controlled rectifier at a predetermined point in each half cycle thereby regulating the pulse width of the inverter output, and circuit means connecting said inductor, said turn-off controlled rectifier and said capacitor in circuit so that when said controlled rectifier is triggered said capacitor is connected in parallel circuit with said inductor and in circuit with the conducting controlled rectifier to reverse bias said conducting one of said pair of controlled rectifiers, said inductor and commutating capacitor forming an oscillatory circuit when said turn-off controlled rectifier is conducting and the reversal of current in said oscillatory circuit causing said turn-off controlled rectifier to be turned off.

References Cited in the file of this patent
UNITED STATES PATENTS 3,047,789    Lowry _____ July 31, 1962